United States Patent
Takeda

(10) Patent No.: US 11,104,281 B2
(45) Date of Patent: Aug. 31, 2021

(54) VEHICLE ENGINE ROOM STRUCTURE

(71) Applicant: HONDA MOTOR CO., LTD., Tokyo (JP)

(72) Inventor: Tomoya Takeda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/905,217

(22) Filed: Jun. 18, 2020

(65) Prior Publication Data

US 2020/0398769 A1    Dec. 24, 2020

(30) Foreign Application Priority Data

Jun. 19, 2019  (JP) .............................. JP2019-113504

(51) Int. Cl.
 *B60R 13/08* (2006.01)
 *B62D 25/08* (2006.01)
 *B62D 25/14* (2006.01)

(52) U.S. Cl.
 CPC ........ *B60R 13/0838* (2013.01); *B62D 25/082* (2013.01); *B62D 25/14* (2013.01)

(58) Field of Classification Search
 CPC .... B60R 13/0838; B62D 25/082; B62D 25/14
 USPC ..................................................... 296/181.6
 See application file for complete search history.

(56) References Cited

U.S. PATENT DOCUMENTS

2009/0075041 A1 * 3/2009 Schweiggart ........... F02B 77/11
428/209

FOREIGN PATENT DOCUMENTS

JP    4370895 B2 * 11/2009
JP    4370895 B2    11/2009

* cited by examiner

*Primary Examiner* — Joseph D. Pape
*Assistant Examiner* — Dana D Ivey
(74) *Attorney, Agent, or Firm* — Rankin, Hill & Clark LLP

(57) ABSTRACT

Provided is a vehicle engine room structure to cause high-temperature air in an engine room to be discharged outside, regardless of the presence or absence of rushing air. The structure includes: a baffle plate including a curved portion to surround a turbocharger of a vehicle from behind, when disposed in a vehicle, and an extending portion continuous from the curved portion and extending upward, when disposed in the vehicle. The baffle plate is disposed between the turbocharger and a lower dash panel of the vehicle. The baffle plate further includes a lower fixing portion fixed to the lower dash panel. The baffle plate and the lower dash panel define an installation space therebetween, in which in-vehicle components are installed.

9 Claims, 7 Drawing Sheets

FIG. 5
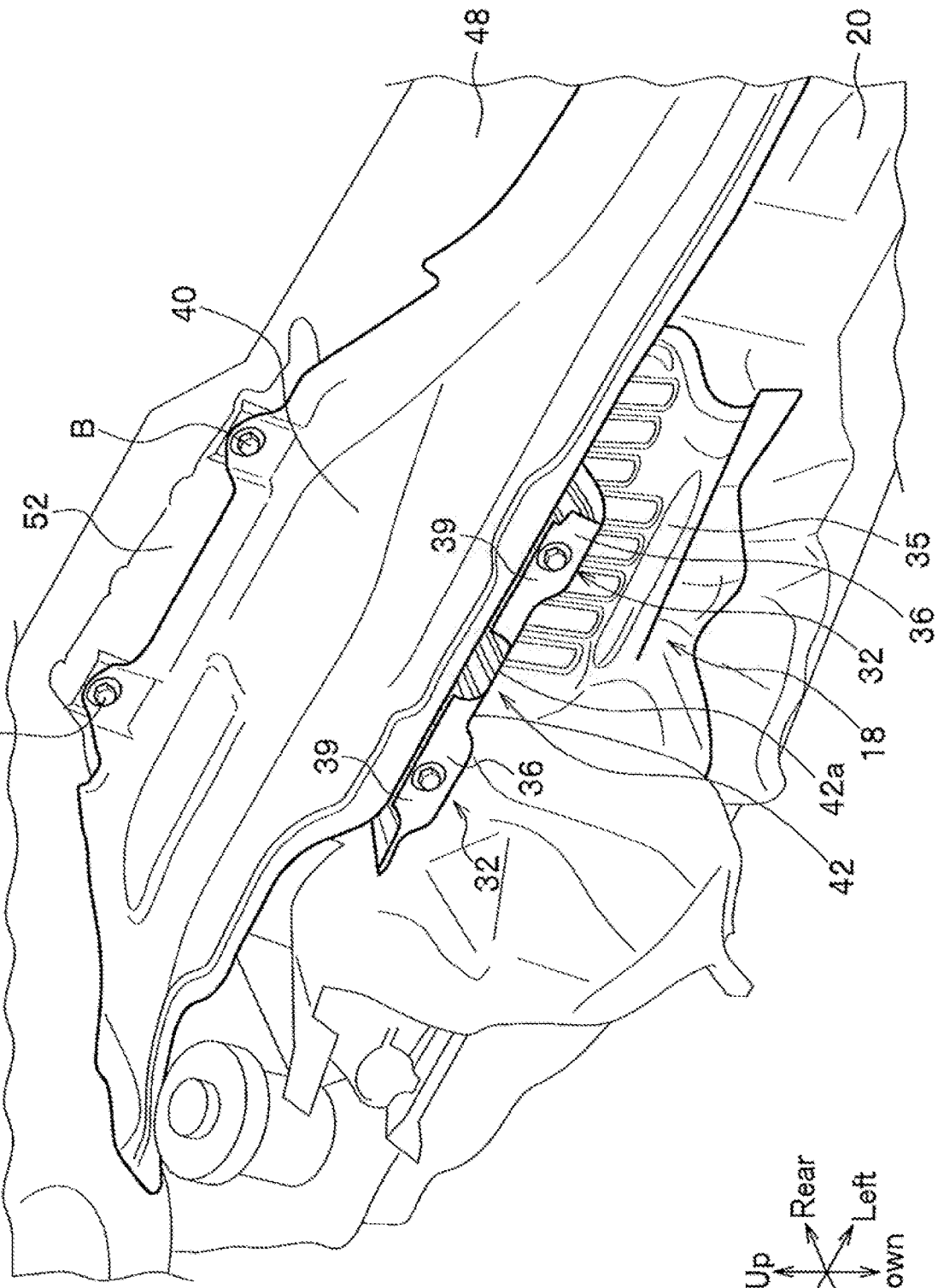
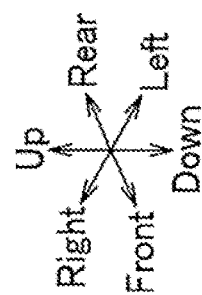

VEHICLE ENGINE ROOM STRUCTURE

CROSS-REFERENCE TO RELATED APPLICATION

This application claims the benefit of priority to Japanese Patent Application No. 2019-113504 filed on 19 Jun. 2019, the disclosures of all of which are hereby incorporated by reference in their entireties.

TECHNICAL FIELD

The present invention relates to a vehicle engine room structure.

BACKGROUND OF THE INVENTION

Japanese Patent No. 4370895 (hereinafter, referred to as Patent Document 1) discloses a baffle plate (heat shield plate) attached on a portion, obliquely inclined with respect to the vehicle front-rear direction, of an exhaust system extending toward a vehicle floor from an internal combustion engine, which is mounted in an engine room at the front of a vehicle body, so as to cover a front surface of the exhaust system to face the engine room.

In Patent Document 1, a baffle plate (heat shield plate) is disposed at an angle in front of a catalytic converter, when disposed in a vehicle, to generate a negative pressure by rushing air to induce an air flow so that high-temperature air in the engine room is discharged under the floor.

SUMMARY OF THE INVENTION

Problems to be Solved

However, in the engine room structure disclosed in Patent Document 1, the airflow is induced by rushing air and therefore high-temperature air may not be discharged under the floor when there is no rushing air.

The present invention has been made in view of the above-identified problem, and is intended to provide a vehicle engine room structure to cause high-temperature air in an engine room to be discharged outside, regardless of the presence or absence of rushing air.

Solution to Problem

The present invention provides a vehicle engine room structure to solve the above-identified problem and include: a baffle plate including a curved portion to surround a heat generation source of a vehicle from behind, when disposed in a vehicle, and an extending portion continuous from the curved portion and extending upward, when disposed in the vehicle, wherein the baffle plate is disposed between the heat generation source and a lower dash panel of the vehicle, the baffle plate further includes a lower fixing portion fixed to the lower dash panel, and the baffle plate and the lower dash panel define an installation space therebetween, in which in-vehicle components are installed.

Advantageous Effects of the Invention

The present invention provides a vehicle engine room structure to cause high-temperature air in the engine room to be discharged outside, regardless of the presence or absence of rushing air.

BRIEF DESCRIPTION OF DRAWINGS

FIG. 5 is a partially enlarged perspective view of the front portion of the vehicle body, as viewed obliquely from above;

EMBODIMENTS OF THE INVENTION

Next, an embodiment of the present invention is described in detail, with reference to the drawings as required. In each of the drawings, "front-rear" indicates a vehicle front-rear direction, "right-left" indicates a vehicle width direction (right-left direction), and "up-down" indicates a vehicle up-down direction (vertical direction).

Figure 1:
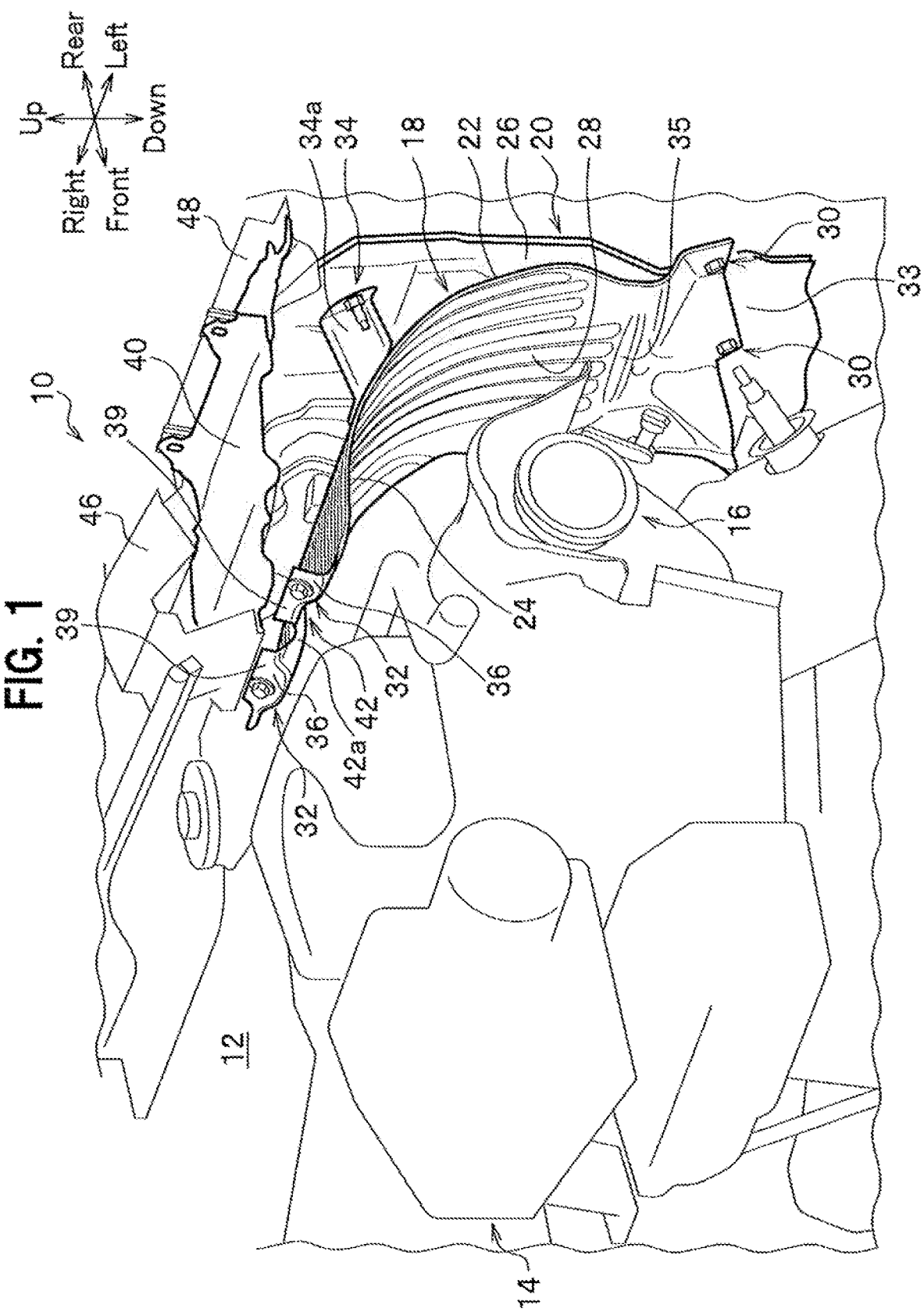
FIG. 1 is schematic perspective view of a front portion of a vehicle body to which a vehicle engine room structure according to an embodiment of the present invention is applied.

As shown in FIG. 1, an engine room 12 of a vehicle 10, to which a vehicle engine room structure according to an embodiment of the present invention is applied, is provided therein with an engine 14 as an internal combustion engine, a turbocharger (heat generation source) 16 disposed in the vehicle behind the engine 14, a baffle plate 18, and a lower dash panel 20.

The turbocharger 16 is a supercharger to drive a compressor using a flow of exhaust gas to increase density of air taken in by the internal combustion engine (engine 14). For example, the turbocharger 16 includes a turbine to receive a flow of exhaust gas so as to be rotated, a shaft to transmit a rotational force of the turbine, and a compressor to take in air using the transmitted rotational force of the turbine for compression.

The baffle plate 18 is disposed between the turbocharger 16 and the lower dash panel 20 in the vehicle front-rear direction. The baffle plate 18 includes a curved portion 22 curved to surround the turbocharger 16 from behind, when disposed in the vehicle, as laterally viewed in the vehicle width direction, and an extending portion 24 continuous from the curved portion 22 upward and frontward, when disposed in the vehicle. The extending portion 24 is configured to have a flat surface.

The baffle plate 18 and the lower dash panel 20 define an installation space 26 therebetween. The installation space 26 is defined between the baffle plate 18 and the lower dash panel 20, which are aligned in the vehicle front-rear direction, and extends in the vehicle width direction. In the installation space 26, in-vehicle components (not shown) such as wiring of electric devices and piping are installed, for example.

Figure 2:
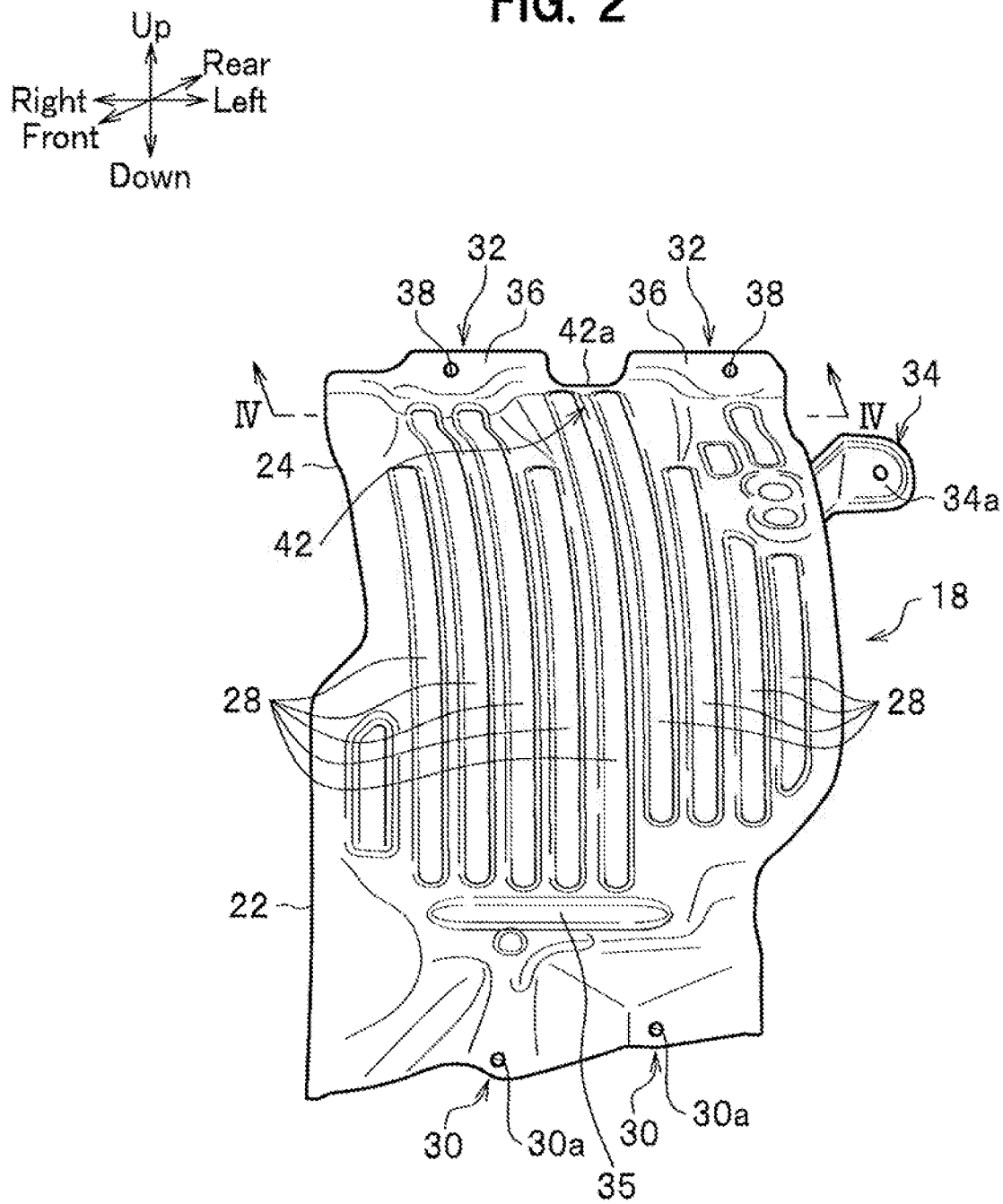
FIG. 2 is a front view of a baffle plate, as viewed from front to back, when disposed in a vehicle.
Figure 3:
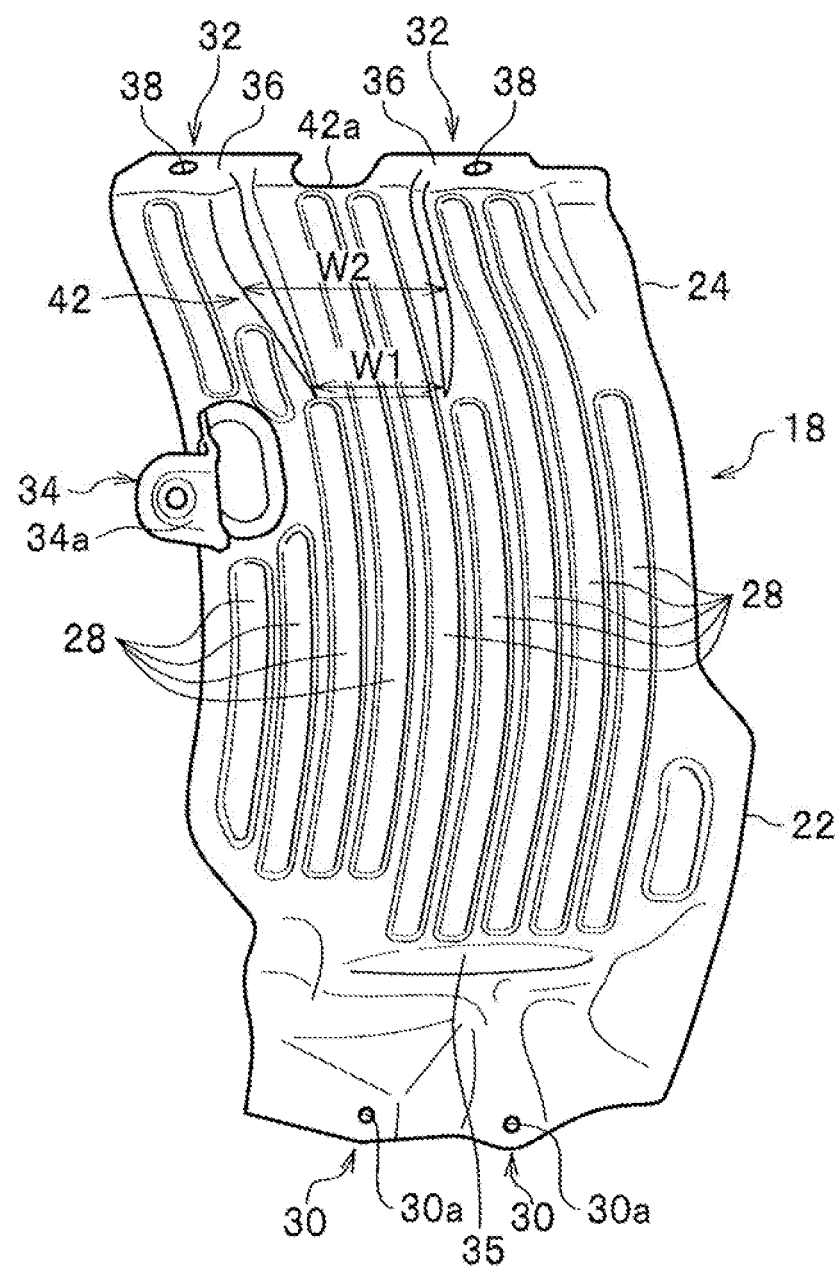
FIG. 3 is a rear view of the baffle plate, as viewed from back to front, when disposed in the vehicle.

The baffle plate 18 has a plurality of vertical beads (beads) 28 extending substantially in parallel to one another in the vehicle up-down direction, as shown in FIGS. 2 and 3. The vertical bead 28 is formed of a convex portion protruding toward the lower dash panel 20. Note that some of the vertical beads 28 have upper portions thereof extended to the extending portion 24, as shown in the drawings.

The baffle plate 18 has a plurality of fixing portions to be fixed to vehicle body members via fastening means such as bolts and nuts. The fixing portion includes a lower fixing portion 30, an upper fixing portion 32, and an intermediate fixing portion 34. The baffle plate 18 (curved portion 22 and extending portion 24) is solidly held by three members of the lower fixing portion 30, intermediate fixing portion 34, and upper fixing portion 32.

The lower fixing portions 30 are provided at the lower end of the curved portion 22 and are arranged in a pair at a predetermined distance in the vehicle width direction, as shown in FIGS. 2 and 3. The lower fixing portion 30 includes a bolt and a nut, and a bolt insertion hole 30*a* through which the bolt is inserted. The lower fixing portion 30 is fixed to the lower dash panel (vehicle body member) 20 so as to define the installation space 26, as an installation space for the in-vehicle components, with the lower dash panel 20.

The lower fixing portion 30 is provided so as to face a space 33 between the engine 14 and the lower dash panel 20 (see FIG. 1). A horizontal bead 35 extending in the vehicle width direction is provided above the lower fixing portion 30, when disposed in the vehicle. The horizontal bead 35 is located at a lower position than the lower ends of the vertical beads 28. Note that the horizontal bead 35 is formed to have a convex portion protruding toward the lower dash panel 20, as with the vertical bead 28.

The upper fixing portion 32 is provided at a front and upper end of the extending portion 24, when disposed in the vehicle, and has two flat seating surfaces 36 arranged side by side on both sides in the vehicle width direction thereof. The seating surface 36 is provided with a bolt fastening hole 38 through which a bolt is inserted. The seating surface 36 is formed of an inclined surface 39 inclined so as to extend upwardly rearward from a front end thereof, when disposed in the vehicle, in side view from outside in the vehicle width direction. A lid 40, to be described later, is provided above the seating surfaces 36. Note that the upper fixing portion 32 is fixed (fastened) to a lower portion of a cowl top 46 (vehicle body member), to be described later, via a bolt and a nut (see FIG. 7).

The intermediate fixing portion 34 is provided between the upper fixing portion 32 and the lower fixing portion 30 in the vehicle up-down direction, only on an outer side in the vehicle width direction thereof. The intermediate fixing portion 34 is formed of a bracket 34*a* having a front portion and a rear portion, when disposed in the vehicle, which are bent in opposite directions (inward and outward in the vehicle width direction) to each other. The front bent portion of the bracket 34*a* is joined to the curved portion 22, and the rear bent portion of the bracket 34*a* is fixed (fastened) to the lower dash panel 20 via bolts and nuts (see FIG. 1). The lid 40 is provided above the lower dash panel 20, and the intermediate fixing portion 34 is provided below the lid 40, when disposed in the vehicle (see FIGS. 1 and 7).

Figure 4:
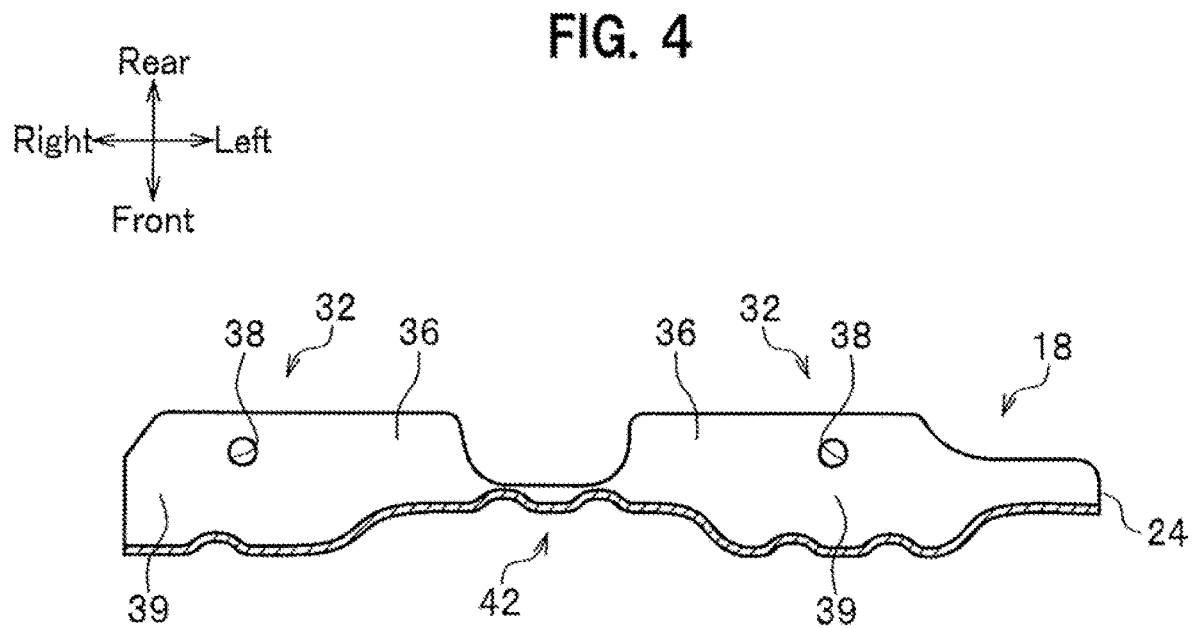
FIG. 4 is a transverse cross-sectional view taken along a line IV-IV in FIG. 2.

A discharge port portion 42 is provided between the two seating surfaces 36 so as to protrude outward relative to other adjacent portions (see FIG. 4). The discharge port portion 42 has a discharge port 42*a* at the center in the vehicle width direction of a front end, when disposed in the vehicle, of the extending portion (see FIG. 1), and is formed to let air heated by the engine 14 and the turbocharger 16 flow along the baffle plate 18 and be discharged through the discharge port 42*a* toward a space above the engine 14, for example, within the engine room 12.

The discharge port portion 42 has a substantially trapezoidal shape in a rear view, as viewed from rear to front when disposed in the vehicle, and is formed to have a size W in the vehicle width direction increasing with distance from a front end, when disposed in the vehicle, of the curved portion 22 on the lower side to the extending portion 24 on the upper side (i.e., W1<W2), as shown in FIG. 3. In other words, the size in the vehicle width direction of the discharge port portion 42 increases toward the upper end of the extending portion 24.

Figure 7:
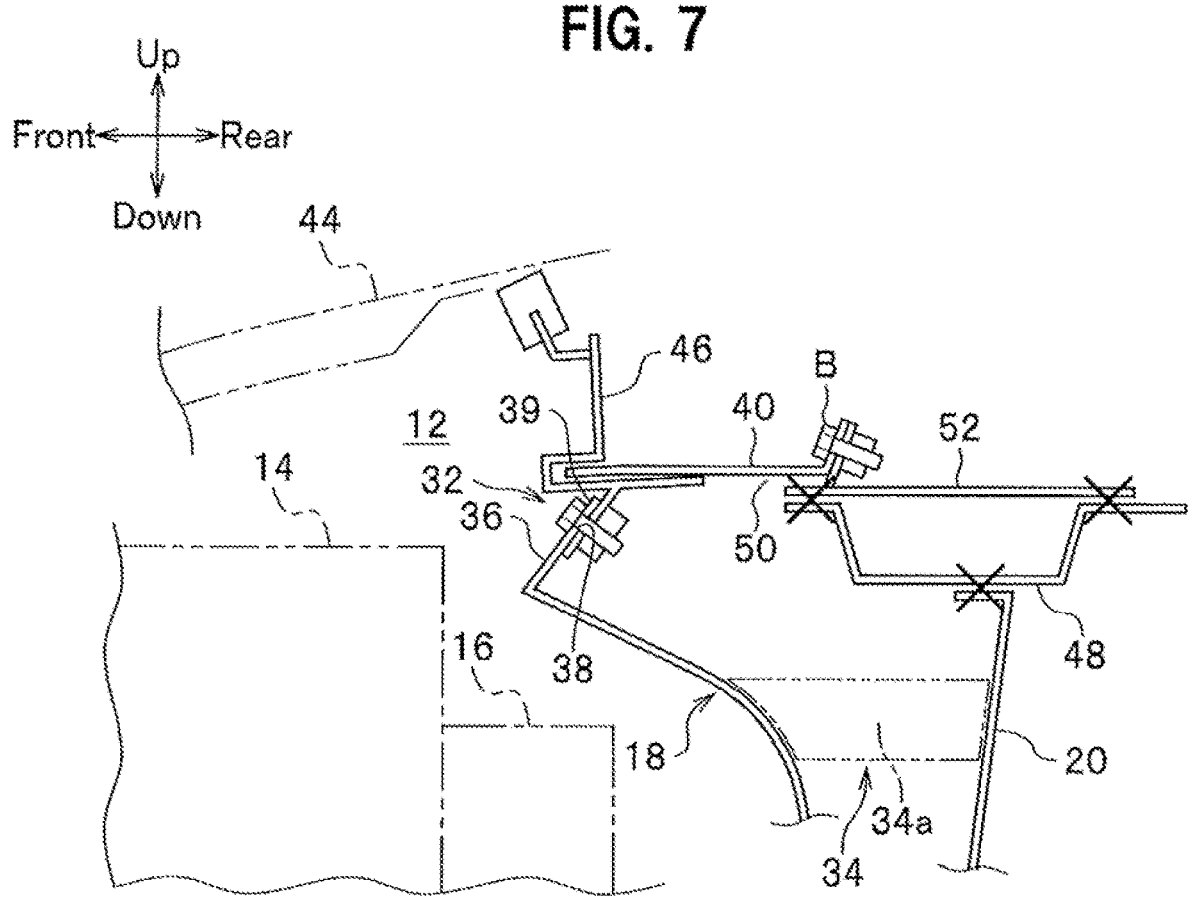
FIG. 7 is a schematic cross-sectional view of the front portion of the vehicle body, as viewed from outside in a vehicle width direction.

A front hood panel 44 to close an opening of the engine room 12 is provided above the engine room 12, as shown in FIG. 7. The front hood panel 44 is formed to be capable of opening and closing the engine room 12 via a hinge (not shown) provided at the rear end thereof, when disposed in the vehicle.

Figure 6:
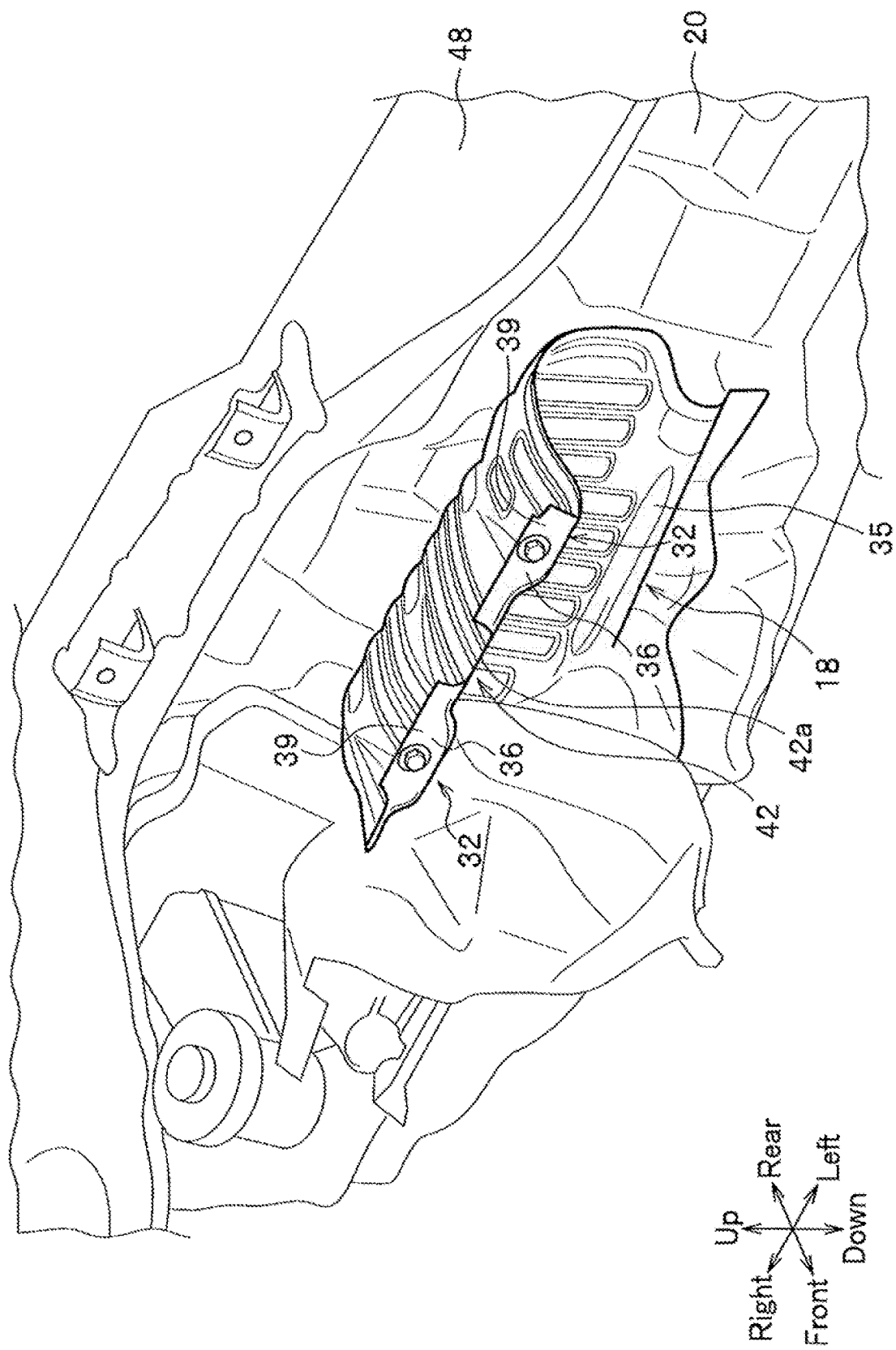
FIG. 6 is a partially enlarged perspective view of the front portion of the vehicle body in FIG. 5 without a lid.

The cowl top 46 is provided behind the front hood panel 44, when disposed in the vehicle. An upper dash panel 48 is joined to the lower dash panel 20 on top of the latter, when disposed in the vehicle. A gap 50 is defined between the cowl top 46 and the upper dash panel 48 in the vehicle front-rear direction. This gap 50 is closed by the lid 40. The lid 40 hangs over the engine 14 and the turbocharger 16, and is detachably mounted via bolts B and nuts (see FIGS. 5 and 6). A patch 52 extending in the horizontal direction is joined to the dash upper panel 48 on top of the latter.

The vehicle 10, having the engine room structure according to the present embodiment applied thereto, is basically configured as described above. Next, advantageous effects of the structure are described.

In the present embodiment, the baffle plate 18 is disposed between the turbocharger 16, as a heat generation source, and the lower dash panel 20, and is provided with the lower fixing portion 30 to be fixed to the lower dash panel 20. Additionally, the baffle plate 18 and the lower dash panel 20 define the installation space 26 therebetween, in which in-vehicle components (not shown) such as wiring and piping of an electric device and the like are installed, for example.

In the present embodiment, high heat from the turbocharger 16 is blocked by the baffle plate 18 so that the in-vehicle components are protected. Additionally in the present embodiment, the air heated to have high heat is guided upward in the vehicle along the curved portion 22, to have the airflow choked and accelerated by the extending portion 24, so as to be discharged above the engine 14. The heated air is then discharged outside the vehicle through a gap between the front hood panel 44 and a front fender (not shown). Thus, a vehicle engine room structure is provided by the present embodiment, to allow for discharging high-temperature heated air in the engine room 12 to the outside, regardless of the presence or absence of rushing air.

In addition, in the present embodiment, the baffle plate 18 has the upper fixing portion 32 fixed to the vehicle body member, and the discharge port portion 42 adjacent to the upper fixing portion 32 for discharging the heated air to the outside. The discharge port portion 42 is provided so as to protrude outward relative to other adjacent portions. This increases the size of the discharge port 42*a* of the discharge port portion 42 in the present embodiment, to increase the flow of the heated air discharged above the engine 14.

Further, in the present embodiment, the discharge port portion 42 increases in size in the vehicle width direction with distance from the front end, when disposed in the vehicle, of the curved portion 22 to the extending portion 24. This increases an opening area of the discharge port 42*a* in the present embodiment, to increase the flow of the heated air to be discharged above the engine 14.

Furthermore, in the present embodiment, the baffle plate 18 has vertical beads 28 extending in the vehicle up-down direction. This allows, in the present embodiment, for maintaining a predetermined curvature of the curved portion 22, even when the baffle plate 18 is made of a thin aluminum plate so as to be reduced in weight, for example.

Moreover, in the present embodiment, the baffle plate 18 has the intermediate fixing portion 34 fixed to the lower dash panel 20. The intermediate fixing portion 34 is provided below the lid 40, when disposed in the vehicle.

If the upper dash panel 48 is extended from above the lower dash panel 20 toward the front of the vehicle to hang over the engine 14, for example, the engine 14 is less easily maintained from above. Therefore, the present embodiment is provided with the lid 40 detachably mounted between the upper dash panel 48 and the cowl top 46, so that the lid 40 is removed to facilitate maintaining the engine 14 from above. Additionally, the baffle plate 18 has the intermediate fixing portion 34 fixed to the lower dash panel 20, so that the upper fixing portion 32 of the baffle plate 18 is accurately kept in position to have no interference even when the lid 40 is mounted. Note that removing the lid 40 releases the intermediate fixing portion 34 from the lower dash panel 20.

Still moreover, in the present embodiment, the upper fixing portion 32 is provided at the front end thereof, when disposed in the vehicle, with the seating surfaces 36 fastened by bolts and nuts, and the seating surfaces 36 are each inclined so as to extend upwardly rearward, when disposed in the vehicle. This facilitates attaching and detaching the baffle plate 18 in the present embodiment, even in a case where the engine 14 and the like are arranged in the front of the vehicle, for example. Therefore, even when the upper dash panel 48 extends frontward in the vehicle from above the lower dash panel 20, the lid 40 hanging over the engine 14 is removed to facilitate maintaining the engine 14.

Still moreover, in the present embodiment, the lower fixing portion 30 is provided so as to face the space 33 between the engine 14 and the lower dash panel 20. In the present embodiment, this facilitates accessing the space 33 between the engine 14 and the lower dash panel 20, to facilitate releasing the lower fixing portion 30 from the lower dash panel 20.

Still moreover, in the present embodiment, the curved portion 22 and extending portion 24 of the baffle plate 18 are held by the lower fixing portion 30, the intermediate fixing portion 34, and the upper fixing portion 32. In the present embodiment, even when the baffle plate 18 is formed in a complex shape such as a composite shape, for example, the baffle plate 18 is held by the multiple fixing portions, so that the baffle plate 18 is accurately arranged in the engine room 12.

Still moreover, in the present embodiment, the horizontal bead 35 is provided above the lower fixing portion 30, when disposed in the vehicle. In the present embodiment, providing the horizontal bead 35 in this manner improves rigidity and strength in the vehicle width direction of the baffle plate 18, to allow for accurately keeping the vertical beads 28, provided above the horizontal beads 35, in position in the vehicle width direction.

LEGEND FOR REFERENCE NUMERALS

10: vehicle, 12: engine room, 14: engine, 16: turbocharger (heat generation source), 18: baffle plate, 20: lower dash panel, 22: curved portion, 24: extending portion, 26: installation space, 28: vertical bead (bead), 30: lower fixing portion, 32: upper fixing portion, 33: space, 34: intermediate fixing portion, 35: horizontal bead, 36: seating surface, 39: inclined surface, 40: lid, and 42: discharge port portion.

What is claimed is:

1. A vehicle engine room structure comprising:
   a baffle plate including a curved portion to surround a heat generation source of a vehicle from behind, when disposed in the vehicle, and an extending portion continuous from the curved portion and extending upward, when disposed in the vehicle,
   wherein
   the baffle plate is disposed between the heat generation source and a lower dash panel of the vehicle,
   the baffle plate further includes a lower fixing portion fixed to the lower dash panel,
   the baffle plate has a vertical bead extending in a vehicle up-down direction, and
   the baffle plate and the lower dash panel define an installation space therebetween, in which in-vehicle components are installed.

2. The vehicle engine room structure as claimed in claim 1, wherein
   the baffle plate has an upper fixing portion fixed to a vehicle body member, and a discharge port portion adjacent to the upper fixing portion for discharging heated air to the outside, wherein
   the discharge port portion is provided so as to protrude outward relative to other adjacent portions.

3. The vehicle engine room structure as claimed in claim 2, wherein
   the discharge port portion increases in size in the vehicle width direction with distance from a front end, when disposed in the vehicle, of the curved portion to the extending portion.

4. The vehicle engine room structure as claimed in claim 2, wherein
   the baffle plate has an intermediate fixing portion fixed to the lower dash panel.

5. The vehicle engine room structure as claimed in claim 4, wherein
   the vehicle body member is provided with a lid detachably mounted, and
   the intermediate fixing portion is arranged below the lid, when disposed in the vehicle.

6. The vehicle engine room structure as claimed in claim 2, wherein
   the upper fixing portion is provided at a front end thereof, when disposed in the vehicle, with a seating surface fastened by a fastening member, and
   the seating surface is inclined so as to extend upwardly rearward, when disposed in the vehicle.

7. The vehicle engine room structure as claimed in claim 4, wherein
   the curved portion and the extending portion are held by the lower fixing portion, the intermediate fixing portion, and the upper fixing portion.

8. The vehicle engine room structure as claimed in claim 1, wherein
   the lower fixing portion is provided so as to face a space between an engine and the lower dash panel.

9. The vehicle engine room structure as claimed in claim 1, wherein
   a horizontal bead is provided above the lower fixing portion, when disposed in the vehicle.

* * * * *